(12) United States Patent
Chandrasekar

(10) Patent No.: US 11,754,760 B2
(45) Date of Patent: Sep. 12, 2023

(54) LIGHTWEIGHT NIGHT VISION SYSTEMS USING BROADBAND DIFFRACTIVE OPTICS

(71) Applicant: The United States of America As Represented By The Director Of The National Geospatial-Intelligence Agency, Springfield, VA (US)

(72) Inventor: Rohith Chandrasekar, Springifeld, VA (US)

(73) Assignee: The United States of America As Represented By The Director Of The National Geospatial-Intelligence Agency, Springfield, VA (US)

( * ) Notice: Subject to any disclaimer, the term of this patent is extended or adjusted under 35 U.S.C. 154(b) by 219 days.

(21) Appl. No.: 17/166,186

(22) Filed: Feb. 3, 2021

(65) Prior Publication Data

US 2022/0244438 A1 Aug. 4, 2022

(51) Int. Cl.
*G02B 5/18* (2006.01)
*G02B 23/12* (2006.01)

(52) U.S. Cl.
CPC .......... *G02B 5/1814* (2013.01); *G02B 23/125* (2013.01)

(58) Field of Classification Search
CPC ...... G02B 5/1814; G02B 23/125; G02B 5/18; G02B 2005/1804; G02B 5/1828; G02B 5/1842; G02B 5/1866; G02B 5/1876; G02B 27/42; G02B 27/4205; G02B 27/4211; G02B 27/4216; G02B 27/4222; G02B 27/4227; G02B 27/4272; G02B 27/4277; G02B 27/4288; G02B 27/4294; G02B 27/44; G02B 23/12
USPC ....... 359/558, 565, 566, 569, 571, 573, 574, 359/575, 576
See application file for complete search history.

(56) References Cited

U.S. PATENT DOCUMENTS

| 5,218,471 | A | 6/1993 | Swanson et al. |
| 5,229,598 | A | 7/1993 | Filipovich |
| 5,895,422 | A * | 4/1999 | Hauber ................ G02B 5/1895 623/6.34 |
| 8,958,154 | B2 | 2/2015 | Taeko et al. |
| 2012/0266937 | A1 | 10/2012 | Menon et al. |
| 2018/0231700 | A1* | 8/2018 | Ahmed ................ G02B 5/1814 |

FOREIGN PATENT DOCUMENTS

KR 20160117416 A * 10/2016

* cited by examiner

*Primary Examiner* — Arnel C Lavarias
(74) *Attorney, Agent, or Firm* — Joseph Fleishman

(57) ABSTRACT

Systems and methods for improving night vision systems are presented. Broadband multi-level diffractive lenses are used in place of either or both of the objective and eyepiece of traditional night vision systems. By using one or more broadband multi-level diffractive lenses, the size, weight, and weight distribution may be reduced or modified.

9 Claims, 4 Drawing Sheets

LIGHTWEIGHT NIGHT VISION SYSTEMS USING BROADBAND DIFFRACTIVE OPTICS

BACKGROUND

The ability to identify and assess objects under low ambient light illumination afforded by night vision (NV) systems is vital for multiple military, law enforcement, and civilian endeavors including: night time military operations; counter-narcotics and other counter-trafficking operations; search and rescue; and wildlife tracking and observation. The first NV systems, developed just before World War II, were large systems that required trucks to move infrared sources in order to illuminate the scene. Revolutionary advances in electronics drastically reduced the size, weight, and power (SWaP) of these systems such that they can now be head-mounted. However, despite these advances, these systems are still quite heavy and bulky.

Current state-of-the-art NV systems include, from the object side: a complex lens objective (OBJ) consisting of several filters and glass lenses; an image intensifier tube (II) consisting of a photocathode, microchannel plate, and phosphor screen; and an eyepiece (EYP) consisting of several lenses. Several decades of improvements have been made to the II tube such that current systems have little resemblance to systems from just three decades ago. However, the optics in the OBJ and EYP have largely remained the same and look no different than lenses used in the first telescopes from 400 years ago. In fact, the optics constitute close to 40% of modern NV systems. The OBJ is also the densest component of NV systems. In head-mounted configurations, the placement of the OBJ at the point furthest from the eye creates a strong moment arm that induces significant physical strain on wearers, limiting agility and extended use of NV systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The present application is directed to systems and methods for improving NV systems by reducing or modifying one or more of the weight, size, or weight distribution of the NV system. Broadband multi-level diffractive lenses (MDLs) are used in place of either or both of the objective (OBJ) and eyepiece (EYP) of traditional NV systems.

In one embodiment, both the OBJ and EYP are replaced with MDLs.

In one embodiment, one of the OBJ or EYP is replaced with a MDL.

In one embodiment, the focal length of at least one MDL may be adjusted to control a balance point of the NV system.

In one embodiment, the NV system is permanently or temporarily attached to an object worn on a user's head.

In one embodiment, the NV system is held in a user's hand.

In one embodiment, the NV system is permanently or temporarily attached to an object.

In one embodiment, the weight of the NV system is at least 30% less than the weight of a conventional NV system with equivalent optical capability.

DESCRIPTION OF THE DRAWINGS

The above and other objects, and advantages of the present disclosure will become more apparent when taken in conjunction with the following description and drawings wherein identical reference numerals have been used, where possible, to designate identical features that are common to the figures, and wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Further, various illustrated or described portions of processes may be re-ordered or executed in parallel in various different embodiments.

Further, although some of the examples provided may not contain features described with regard to another example, such a description is provided as an example and not a limitation. As those skilled in the art will appreciate, any of the features associated with an example may be incorporated into any other example provided without departing from the scope of the disclosure.

Night vision is an image intensification technique that allows users to see objects under low-light illumination. NV systems amplify visible (VIS) and short-wave infrared (SWIR) moonlight or starlight reflected from objects in the scene.

Figure 1:
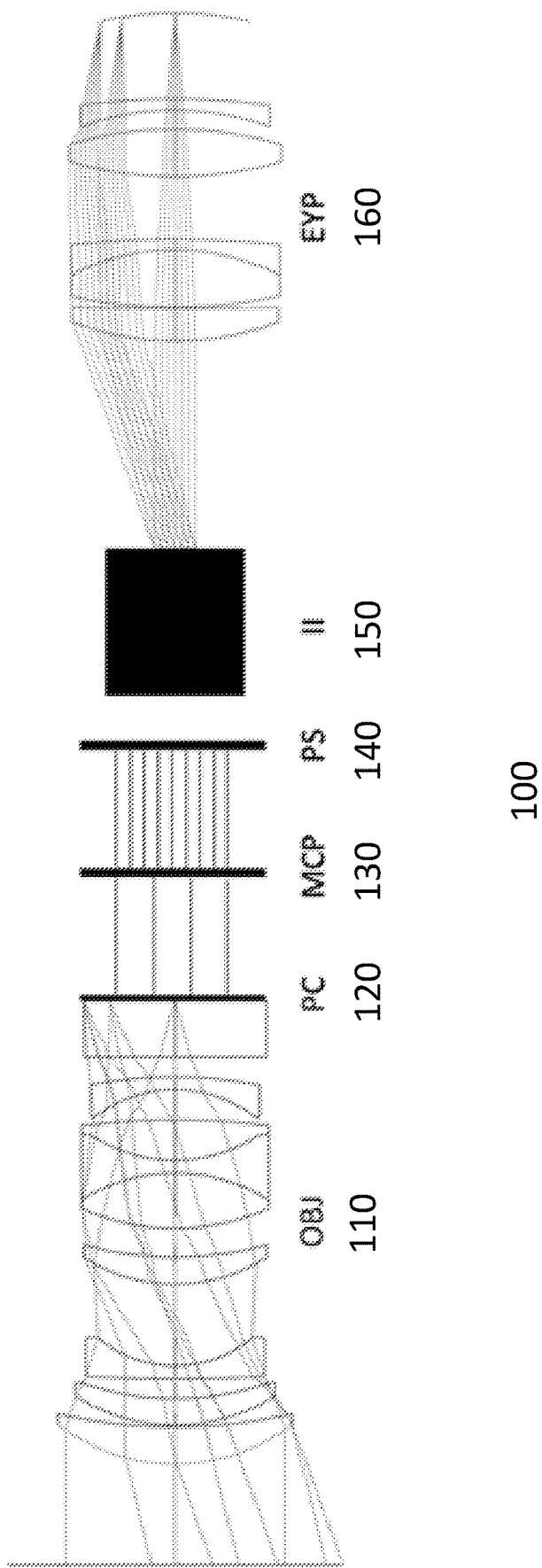
FIG. 1 shows a schematic for the AVS/AS 9 NV goggles system with all optical and electrical components.

FIG. 1 shows the components of a traditional NV system 100, such as the AVS/AS-9 system. The input OBJ 110 collects photons from a wide field of view across a broad bandwidth, inverts the image, and feeds the photons to a photocathode (PC) 120 that converts the photons into electrons. A microchannel plate (MCP) 130 is a planar component that serves as an electron multiplier that maintains spatial resolution. The MCP may amplify the electronic signal by several orders of magnitude. A phosphor screen (PS) 140 is then used to convert the multiplied electrons back to green photons. Since the OBJ inverted the image, an image inverter (II) 150 is needed to bring the image back to its original orientation. An EYP 160 is then used to focus the image into a user's eye.

The OBJ 110 requires a complex set of ~7 lenses to ensure optimal performance across a broad bandwidth (~650-900 nm), achieve a large field-of-view, and correct for higher-order aberrations. The OBJ 110 is the densest component in the NV system 100, weighing almost 65 grams or 20% of the system weight. Furthermore, in head-mounted systems, the OBJ 110 is the component furthest from the eye; this placement generates a strong moment arm that induces significant physical strain on the user and inhibits extended use of the system.

Since the phosphor screen 140 generates green photons, the output light for the NV system 100 is narrowband centered around 515 nm. Because the EYP 160 operates over a much smaller bandwidth compared to the OBJ 110, the EYP 160 requires fewer lenses for chromatic aberration correction. The weight of the EYP 160 is around 60 grams, which constitutes almost 18% of the total NV system 100 weight.

Figure 2:
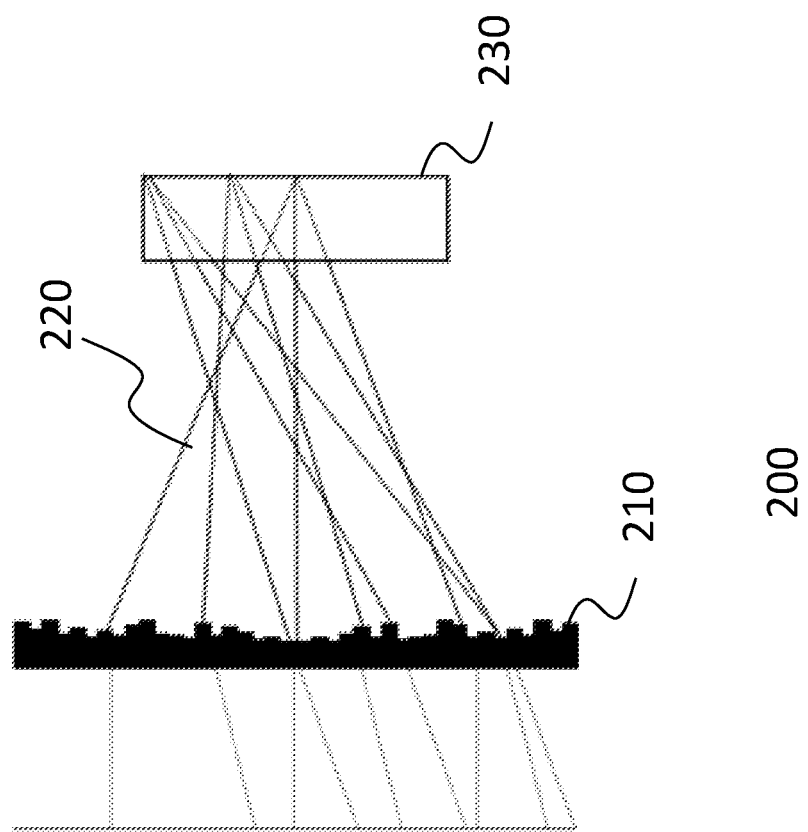
FIG. 2 shows a schematic for a multi-level diffractive lens with the same optical performance as the AVS/AS-9 objective in FIG. 1.

FIG. 2 shows a schematic of a MDL 200 replacement for the OBJ 100, with the same aperture size and optical performance. While the MDL 200 is depicted as providing the same aperture size and optical performance of the OBJ 100, those skilled in the art will recognize that this is merely one exemplary embodiment and that a MDL may be designed to meet any aperture size and performance metrics. The MDL 200 comprises multi-level gratings 210 further comprising a plurality of structures that create a diffraction pattern across the surface of the lens 230. The MDL 200 is designed using an adjoint-based inverse design methodology that designs the multi-level gratings to achieve required performance metrics. The MDL 200 can be fabricated using a variety of dielectrics, including oxides, polymers, diamond, and other materials as known in the art. The multi-level gratings 210 may be created using a direct-laser write approach that can create structures ranging in size from tens of microns to tens of centimeters. Alternatively, the multi-level gratings 210 may be created using photoresist procedures, imprint lithography, and other techniques known in the art.

Figure 3:
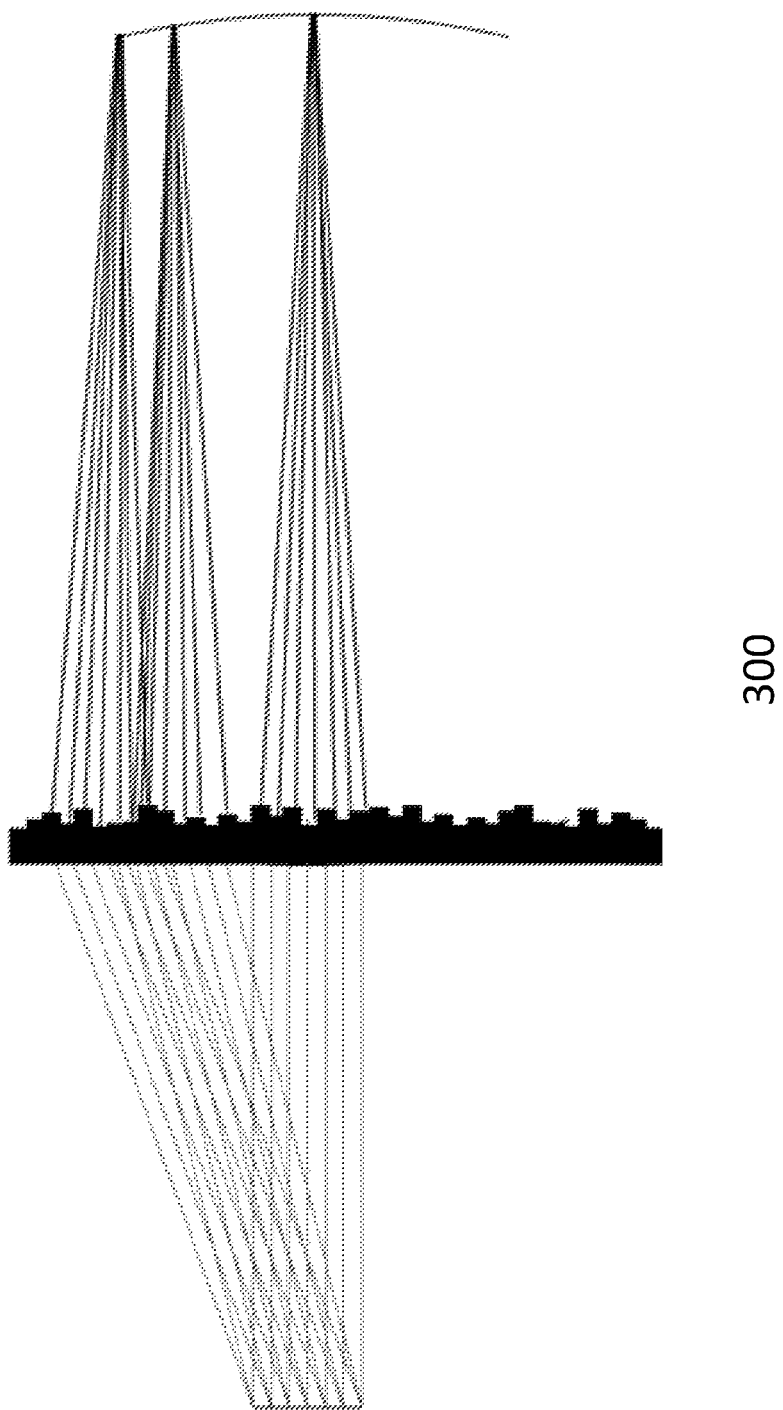
FIG. 3 shows a schematic for a MDL with the same optical performance as the AVS/AS-9 eyepiece.

FIG. 3 shows the schematic of the proposed MDL 300 replacement for the EYP 160 with the same aperture size and optical performance. As noted above, while the MDL 300 is depicted as providing the same aperture size and optical performance of the EYP 160, those skilled in the art will recognize that this is merely one exemplary embodiment and that a MDL may be designed to meet any aperture size and performance metrics. The MDL 300 will be designed using the same approach as the MDL 200 for the OBJ 110 but to match the EYP 160 optical performance metrics.

Figure 4:
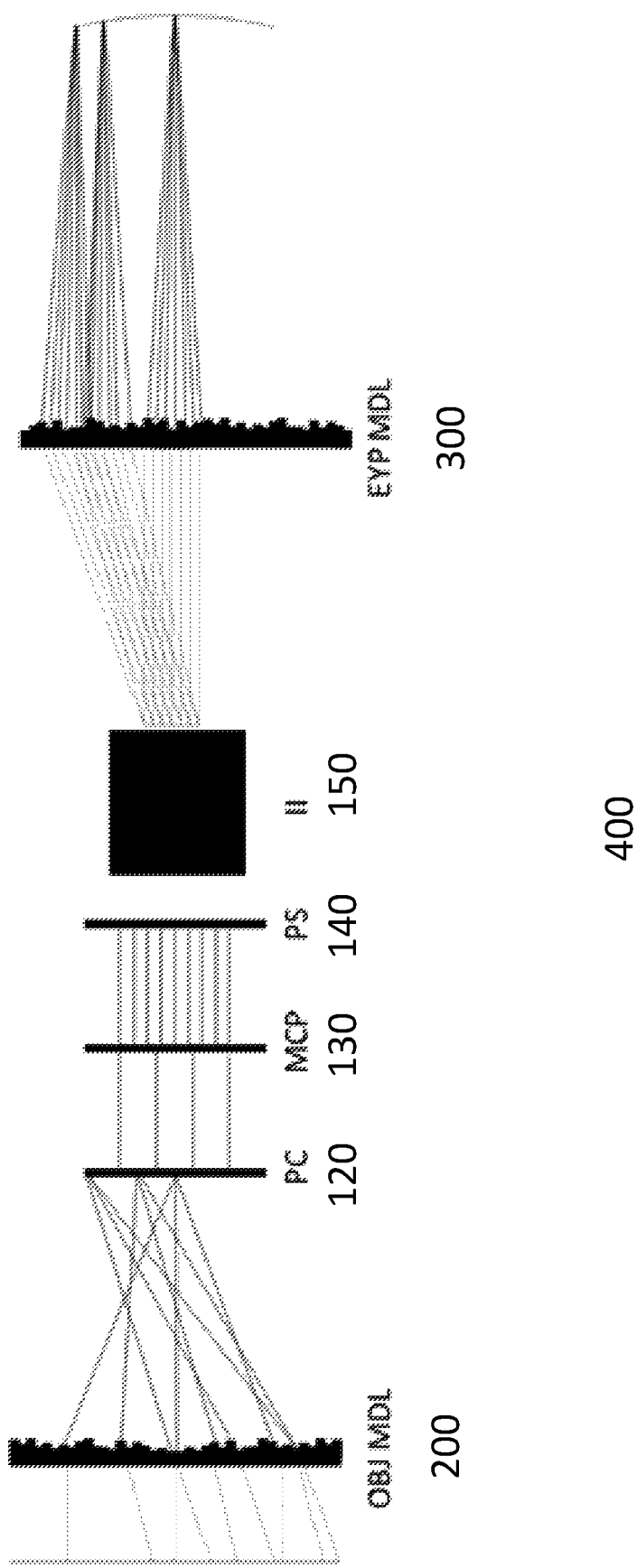
FIG. 4 shows a schematic for a full MDL NV system with all optical and electronic components

FIG. 4 shows the full proposed NV system 400 with the MDL 200 and MDL 300 replacements for the OBJ 110 and EYP 160. The OBJ 110 and EYP 160 together weigh almost 125 grams, which constitutes close to 40% of the NV system 100 weight. By replacing OBJ 110 and EYP 160 with MDL 200 and MDL 300, respectively, NV system 400 is ~35% lighter and has a shorter tube length than NV system 100. This reduction in size and weight induces less physical strain on the user, enables extended use of the system, and enhances the agility of the user.

Although the preceding description is directed to an embodiment in which both the OBJ and EYP are replaced by MDLs, those skilled in the art will appreciate that this simply one exemplary embodiment and that systems may be designed in which only one of the OBJ or EYP is replaced with a MDL and that such systems do not depart from the spirit of this disclosure.

In at least one embodiment of the present disclosure, the center of gravity of the NV system may be manipulated by adjusting the focal lengths of at least one of the MDLs. Adjusting the center of gravity of the NV system may be used to optimize a balance point of the NV system or to influence a center of gravity or balance point of an object the NV system may be attached to. The focal lengths of at least one of the MDLs may be adjusted by modifying at least one period and height of the multi-level grating of the MDL being adjusted. The modification may be done using techniques described above, or any other suitable technique known in the art.

In at least one embodiment, at least one portion of the NV system is either permanently or temporarily attached to an object worn on a user's head. Examples of such objects include, but are not limited to, headbands, helmets, hard hats, visors, brimmed or brimless hats, and face shields. Examples of temporary attachment mechanisms include, but are not limited to, hook and loop fasteners such as Velcro® removable adhesive strips, elastic bands, rail mounting systems such as Picatinny rails, suction devices, spring-loaded and other mechanical clips or clamps, and any other temporary attachment technique known in the art.

In at least one embodiment, at least one portion of the NV system is held in a user's hand.

In at least one embodiment, at least one portion of the NV system is permanently or temporarily attached to other objects using attachment techniques described elsewhere in this specification or as otherwise known in the art. Examples of such other objects include, but are not limited to, range finders, speed detectors, monocular or binocular magnification devices, firearms or other weapon systems, still or video cameras, audio recording devices (including directional microphones), or any other object that a user may wish to use in low-light environments.

In one embodiment, the weight of the NV system is at least 30% less than the weight of a conventional NV system with equivalent optical capability.

The invention claimed is:

1. A night vision system comprising at least one broadband multi-level diffractive lens wherein the at least one broadband multi-level diffractive lens is a replacement lens and the system is lighter than a conventional system with equivalent optical capability.

2. The system of claim 1, wherein the at least one broadband multi-level diffractive lens is arranged to focus an image on at least one photocathode.

3. The system of claim 1, wherein the at least one broadband multi-level diffractive lens is arranged to focus an image on at least one user's eye.

4. The system of claim 1, wherein a focal length of the at least one broadband multi-level diffractive lens is based at least in part on achieving a specified balance point of a weight of the system.

5. The system of claim 1, wherein the system is temporarily attached to an object worn on a user's head.

6. The system of claim 1, wherein the system is temporarily attached to an object held in a user's hand.

7. The system of claim 1, wherein the system is smaller than a conventional system with equivalent optical capability.

8. The system of claim 1 further comprising at least a second broadband multi-level diffractive lens.

9. A system comprising at least one broadband multi-level diffractive replacement lens, wherein the at least one broadband multi-level diffractive replacement lens has a smaller size or weight and a same aperture size and optical performance as at least one conventional lens used in a night vision system.

\* \* \* \* \*